United States Patent [19]
Chen et al.

[11] Patent Number: 5,241,383
[45] Date of Patent: Aug. 31, 1993

[54] PSEUDO-CONSTANT BIT RATE VIDEO CODING WITH QUANTIZATION PARAMETER ADJUSTMENT

[75] Inventors: Cheng-Tie Chen, Bridgewater Township, Somerset County; Andria H. Wong, Morristown Township, Morris County, both of N.J.

[73] Assignee: Bell Communications Research, Inc., Livingston, N.J.

[21] Appl. No.: 882,487

[22] Filed: May 13, 1992

[51] Int. Cl.⁵ .......................................... H04N 7/133
[52] U.S. Cl. .................................... 358/136; 358/133
[58] Field of Search ..................... 358/133, 136, 261.2, 358/404, 430, 432, 466

[56] References Cited

U.S. PATENT DOCUMENTS

| | | | |
|---|---|---|---|
| 5,038,209 | 8/1991 | Hang | 358/136 |
| 5,134,476 | 7/1992 | Aravind | 358/133 |
| 5,144,425 | 9/1992 | Joseph | 358/133 |

OTHER PUBLICATIONS

"Description of Reference Model 8 (RM8)," CCITT SGXV, Doc. 525, Working Party XV/4 Specialists Group on Coding for Visual Telephony, Jun. 1989.
"MPEG Video Simulation Model 3," ISO/MPEG, Doc. 90/041, International Organization For Standardization, Jul. 1990.
"Scene Adaptive Coder," W-H Chen et al., IEEE Trans. Comm., vol. Com-32, No. 3, pp. 225-232, Mar. 1984.

*Primary Examiner*—Howard W. Britton
*Assistant Examiner*—Bryan S. Tung
*Attorney, Agent, or Firm*—Leonard Charles Suchyta; James W. Falk

[57] ABSTRACT

A method for coding frames of video wherein a coding circuit (14,16,18) includes a processor (30) for performing an orthogonal transform such as a discrete cosine transform and a quantizer (32) for quantizing the resulting transform coefficients. The coding circuit codes the video frames using intra-frame, predictive or interpolative coding to generate code bits at a variable rate. The code bits are stored at a variable rate in a rate buffer (22), which transmits the code bits into a communication channel (24) at a pseudo-constant rate, i.e. a rate which is constant in every time interval of one frame. To maintain the contents of the rate buffer (22) within predetermined limits, the quantization parameters utilized by the quantizer (32) are periodically adjusted to increase or decrease the amount of code bits generated by the coding circuit. The quantization parameters are changed on a global SGOP level to avoid changes of quantization parameters and corresponding changes in decoded image quality within particular frames. The change in quantization parameters for coding the next SGOP is determined by a deviation measure between the actual number of code bits generated by the coding circuit (14,16,18) for the previous SGOP and an estimate of the number of code bits for the previous SGOP. The estimated number of code bits is determined based on the contents of the rate buffer (22) such that the rate buffer (22) will be emptied in a predetermined time period.

23 Claims, 6 Drawing Sheets

PSEUDO-CONSTANT BIT RATE VIDEO CODING WITH QUANTIZATION PARAMETER ADJUSTMENT

FIELD OF THE INVENTION

The present invention relates to a method for coding video signals. More particularly, the present invention relates to a pseudo-constant bit rate video coding algorithm using motion compensated prediction and interpolation and a self governing rate buffer control strategy.

BACKGROUND OF THE INVENTION

A video coder is utilized to code a video signal such as an HDTV signal for transmission via a telecommunication channel to a remote location, where the video signal is reconstructed by a decoder. To transmit a video signal over a telecommunication channel with a minimum of bandwidth, a video coder which achieves a high compression ratio is utilized.

Highly compressive video coders typically employ coding algorithms which utilize three compression modes: intraframe coding, motion compensated predictive coding, and motion compensated interpolative coding.

The different compression modes are assigned to frames of video as follows. In general, a sequence of video frames is divided into groups of N frames called groups of pictures (GOPs). The first frame of each GOP is intraframe coded. The two other compression modes, predictive and interpolative, are assigned to frames according to the expression N=HL+1, where L is the number of predictive frames in each GOP and M is the distance in frames between an intra-frame and a predictive frame or between two predictive frames. Therefore, the number M−1 is the number of interpolative frames between predictive frames. Each group of adjacent predictive and interpolative frames forms a sub-group of pictures (SGOP). The number of frames in each SGOP is M and the number of SGOPs in each GOP is L.

Intra-frame coding requires no picture information beyond the frame itself. The pixels comprising a frame to be intra-frame coded are divided into small blocks such as 8×8 or 16×16 blocks. Each block is coded by a coding circuit which carries out an orthogonal transformation such as a discrete cosine transform (DCT). A quantizer then quantizes the transform coefficients resulting from the orthogonal transform.

Unlike intra-frame coding, the two other coding modes require prediction or interpolation from one or two neighboring frames. To efficiently reduce the temporal redundancy, some method of motion compensation must be utilized. For each block of pixels in a frame to be predictively coded, the best match block from the nearest previous intra or predictive frame is identified and a corresponding motion vector is obtained. The best match block is used as a motion compensated prediction for the current block. A criterion involving an activity index comparison is used to determine if the current block should be motion compensated. If the test is positive, the current block is coded with a predictive mode, wherein the predictive error (i.e. the difference) between the current block and its motion compensated prediction is DCT coded in conjunction with a quantizer. Otherwise the current block is coded with an intramode, wherein the data in the block is directly DCT transformed and quantized.

The processing of interpolative frames is similar, except that an interpolative frame requires bidirectional prediction. Therefore, motion estimation and compensation are performed twice, once with a previous and once with a subsequent intra or predictive frame. Based on a particular criteria, one of the three—forward prediction, backward prediction, or interpolation of both—is selected as the motion compensated prediction. As in predictive frames, either a predictive mode or an intramode is used to code each block depending on a decision criterion involving an activity index.

In all three compressive coding modes, the transform coefficients resulting from the DCT transform are quantized. To take advantage of lower human visual sensitivity at higher DCT frequencies, larger quantizer step sizes are used for the DCT coefficients at these frequencies. The quantizer can be represented by a matrix comprising the elements q(m,n). Each element or parameter q(m,n) represents the quantizer step size for the DCT coefficient having the location (m,n) in transform space.

After being quantized, the DCT coefficients are then variable length coded or fixed length coded.

The number of code bits required to code a frame varies significantly from frame to frame. Interpolative frames require the least number of code bits and intra-frames require the most code bits.

Although in some cases it may be possible to handle this fluctuation in bit rates in the telecommunication channel or network which transmits the compressively coded video signal, it is preferable for the coding circuit itself to smooth out the fluctuations so as to allow for a simpler network configuration. To smooth out the fluctuations in bit rates, a rate buffer is utilized as an interface between the coding circuit and the network.

To control the bit rate transmitted from the rate buffer into the network to a desired level, it is necessary to control the buffer content, i.e., it is necessary to maintain the fraction of the buffer which is occupied within predetermined limits. To control the buffer content, information about the buffer content is fed back to the coding circuit to control the rate at which bits are generated by the coding circuit. The number of code bits generated by the coding circuit is controlled by controlling the quantizer step sizes. In general, smaller quantizer step sizes result in more code bits and larger quantizer step sizes result in fewer code bits. In addition, it should be noted that in general, busy image regions result in the generation of more code bits than smooth image regions.

A variety of rate buffer control strategies are disclosed in the prior art (see, e.g., CCITT SG XV, "Description of Reference Model 8 (RM8)," Doc. 525, June 1989; ISO/MPEG, "MPEG Video Simulation Model 3," Doc. 90/041, July 1990; W. H. Chen and W. K. Pratt, "Scene Adaptive Coder," IEEE Trans. Comm., Vol. COM-32, pp. 225-232, Mar. 1984). In these strategies, the quantizer step sizes are determined based on the current buffer content without regard for the transitions in video quality caused by changes to the quantizer. This strategy requires an a priori knowledge of a mapping between buffer content and particular quantizer step sizes. While this strategy may pilot the buffer contents to a normal state relatively quickly, the quality within frames or between frames is not uniform. Consider a frame where the first part is busy and the second part smooth. Because busy image sections result in the generation of more code bits than smooth image sections, coding the first part of this frame will fill the rate buffer significantly. As a result, the quantizer step sizes used for the second part of the frame may have to be quite large so as to reduce the number of code bits generated to maintain the buffer content at a desired level. Because large quantizer step sizes are utilized for the second part of the frame, the visual quality will be worse for this part of the frame when it is reconstructed at a receiver. This problem is particularly severe for the smooth portion of the frame, as human perception is particularly sensitive to degradation in the smooth and still sections of an image.

In view of the foregoing, it is an object to the present invention to provide a method for coding a video image including a rate buffer control strategy which overcomes the problems associated with conventional rate buffer control strategies such as sharp changes in video quality and changes in video quality within particular frames. More specifically, it is an object of the invention to provide a rate buffer control strategy which enables a substantially constant bit rate from the rate buffer into the network, despite the fluctuations in bits received from the coding circuit as a result of alternating between intra-frame, predictive, and interpolative coding.

SUMMARY OF THE INVENTION

In accordance with the present invention, frames of video are coded by a coding circuit including a processor for performing an orthogonal transform such as a discrete cosine transform and a quantizer for quantizing the resulting transform coefficients. The coding circuit codes the video frames using an intra-frame coding mode or an interframe coding mode, which may be predictive or interpolative, to generate code bits at a variable rate. To smooth out the rate variations, the code bits are stored in a rate buffer and transmitted from the rate buffer into a communication channel at a pseudo-constant rate, i.e., a rate which is constant over each frame time interval. To maintain the contents of the frame buffer within predetermined limits so as to achieve the desired pseudoconstant bit rate, the quantizer step sizes utilized by the quantizer are periodically adjusted in accordance with a unique adjustment strategy to increase or decrease the number of code bits generated by the coding circuit.

In contrast to conventional rate buffer and quantizer control strategies, the rate buffer and quantizer control strategy of the present invention
1) constrains quantizer changes so that smooth quality transitions in the decoded image are achieved,
2) adjusts the quantizer on a more global basis, e.g., once per SGOP, so that bit rate fluctuations caused by different compression modes can be accounted for, but without changing quantization parameters within particular frames,
3) adjusts the quantization parameters based on the deviation of an actual number of code bits from an estimated number of code bits, instead of simply basing the adjustment on buffer content, so as to achieve superior quantizer adjustments.

For a coding circuit which alternates between intra-frame, predictive and interpolative coding, maintaining a constant bit rate (between the rate buffer and the communication channel) at all times is not presently realistic because of the drastic local bit rate differences resulting from the different compression modes. However, the coding method of the present invention controls the rate buffer so that the bit rate transmission into the communication channel is pseudo-constant—i.e., constant over each frame time interval—despite the fluctuations in code bits produced by the coding circuit for the various compression modes.

DETAILED DESCRIPTION OF THE INVENTION

A. Frame Organization

Figure 1:
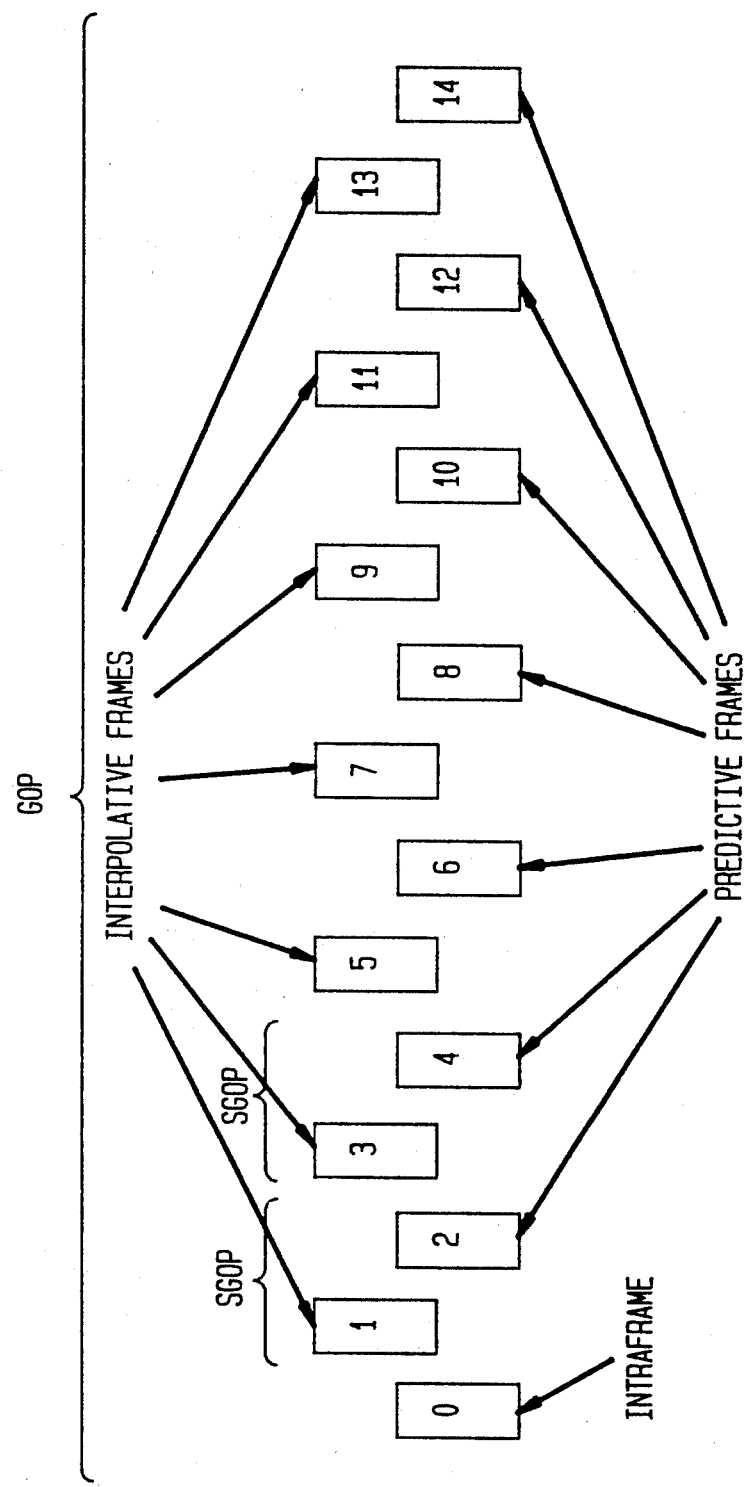
FIG. 1 schematically illustrates a group of video frames known as a GOP and identifies the compression mode—known intra-frame, predictive, or interpolative—used to code each frame.

In accordance with an illustrative embodiment of the present invention, a sequence of frames to be coded is organized into groups referred to as groups of pictures (GOPs). One such group of pictures is illustrated in FIG. 1. Each group of pictures comprises N frames. In FIG 1, $N-15$ so that fifteen frames labeled frame 0,1, . . . ,14 are illustrated. The first frame, i.e., frame 0, is coded using an intra-frame coding technique. The remainder of the frames in the GOP are interframe coded using a predictive or an interpolative coding technique. As indicated above, predictive or interpolative coding is assigned to a frame in a GOP according to the formula $N=ML+1$, where for a given N, L is the number of predictive frames in the GOP and M is the frame distance between an intra-frame and a predictive frame or between two predictive frames. The number $M-1$ is therefore the number of interpolative frames between predictive frames. In FIG. 1, $N=15$, $M=2$, and $L=7$. Each group of adjacent interpolative and predictive frames is named as a sub-group of pictures (SGOP). The number of frames in each SGOP is M and the number of SGOPs in each GOP is L. In FIG. 1, an SGOP is identified. The frames which are predictively and interpolatively coded are labeled as such.

In the example of FIG. 1, frame 0 is coded with the intra-frame mode. Because the processing of interpolative frames requires information from the next intra or predictive frame, the frame processing order cannot follow the natural sequence of frame numbering. Thus, following the processing of frame 0, frame 2 is processed with the predictive mode, followed by frame 1 with the interpolative mode, frame 4 with the predictive mode, frame 3 with the interpolative mode and so on (i.e., the order is frame 0, 2, 1, 4, 3, etc.).

B. Coding Techniques

Figure 2:
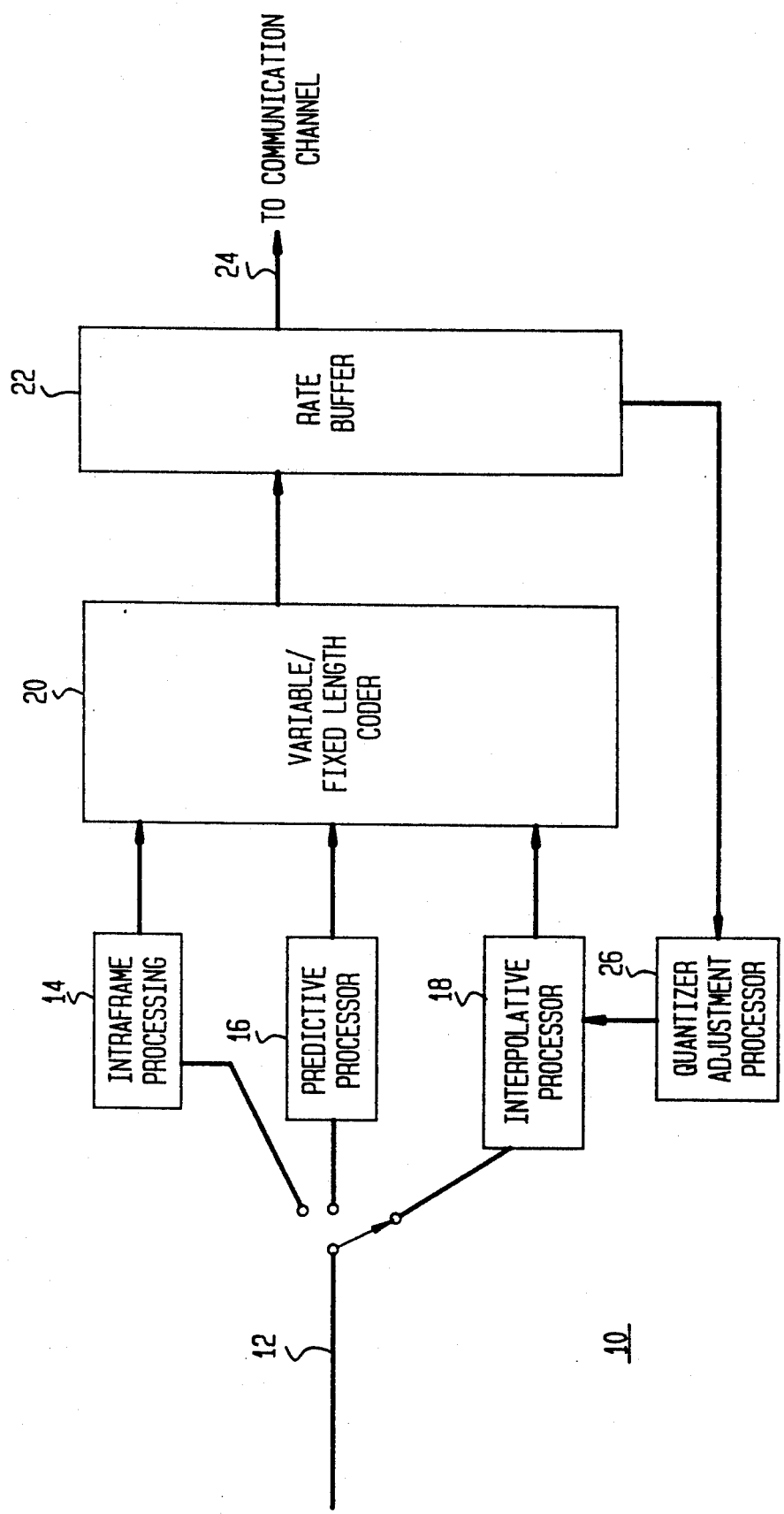
FIG. 2 schematically illustrates a coding circuit and rate buffer for carrying out the inventive coding algorithm.

FIG. 2 schematically illustrates the operation of a coding circuit 10 for carrying out the inventive coding method. Frames to be coded are broken up into blocks of pixels such as 8×8 or 16×16 blocks. The blocks are received at the input 12 Depending on whether the frame is to be intra-frame coded, predictively coded or interpolatively coded, the pixel blocks are processed by an intra-frame mode processor 14, a predictive mode processor 16 or interpolative mode processor 18. For purposes of clarity, the processors 14, 16, and 18 are shown as separate devices in FIG. 2. In reality, the processors 14, 16, and 18 utilize certain elements in common as explained in greater detail below. The outputs of the processors 14, 16, and 18 are processed by the coder 20 which converts the outputs into variable length or fixed length code words.

The output of the coder 20 is a variable bit rate. The bit rate varies depending on whether intra-frame, predictive or interpolative processing is utilized, with the bit rate being highest for intra-frame processing and lowest for interpolative processing. The bit rate also varies depending on quantization parameters utilized in the intra-frame, predictive and interpolative modes.

The code words leaving the coder 20 are stored in a rate buffer 22 with a variable bit rate. The fluctuations in bit rate are smoothed out by the rate buffer 22 which interfaces the variable/fixed length coder 20 with the communication channel 24. Because of the variation in bit rates produced by the three compression modes, operating under normal conditions, the rate buffer 22 does not output bits to the communication channel 24 at a truly constant bit rate. However, the present invention does achieve a pseudo-constant bit rate, wherein the bits transmitted into the communication channel have a constant bit rate over each frame time interval.

To accomplish this, a feedback technique is utilized wherein the content of the buffer 22 controls the quantization parameters utilized in the processors 14, 16, and 18. Specifically, the quantization parameters are adjusted to control the number of code bits generated to maintain the contents of the buffer 22 in a predetermined range. Thus, the content of the buffer (i.e., the fraction of its storage space which is occupied) is fed back to a quantizer adjustment processor 26 to control the quantization parameters utilized in the intra-frame, predictive, and interpolative coding modes.

The intra-frame processor 14, predictive mode processor 16, and interpolative mode processor 18 are now considered in greater detail.

Figure 3:
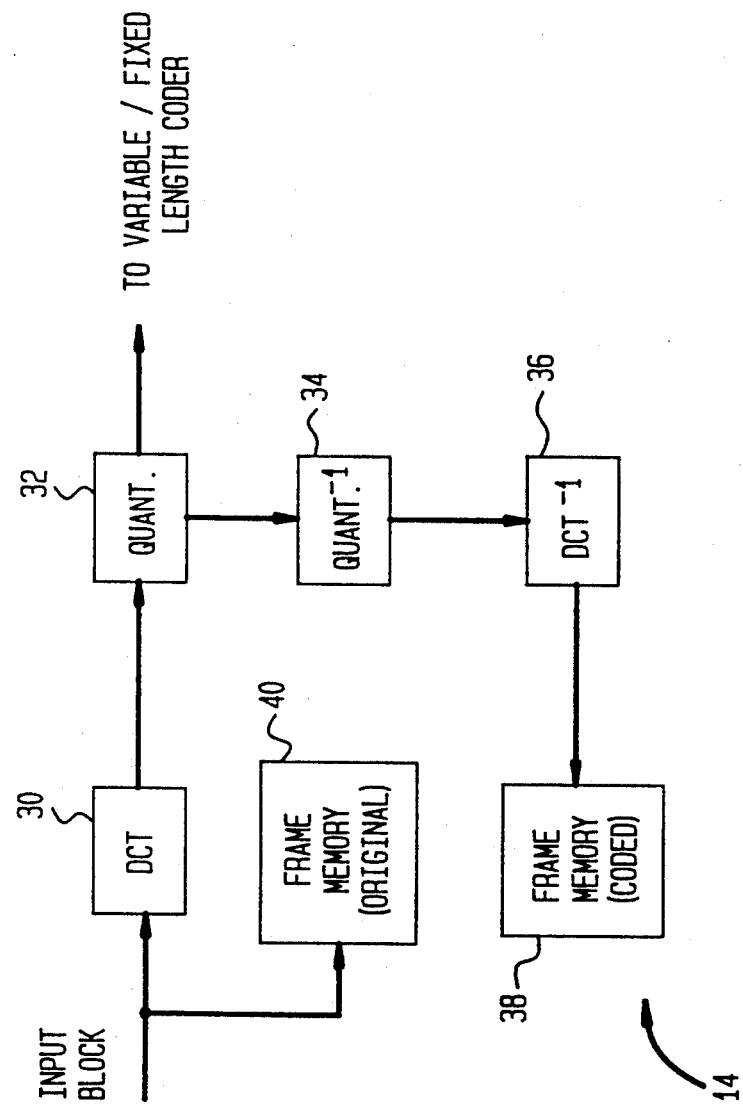
FIG. 3 schematically illustrates a circuit which operates on the intraframes.
Figure 4:
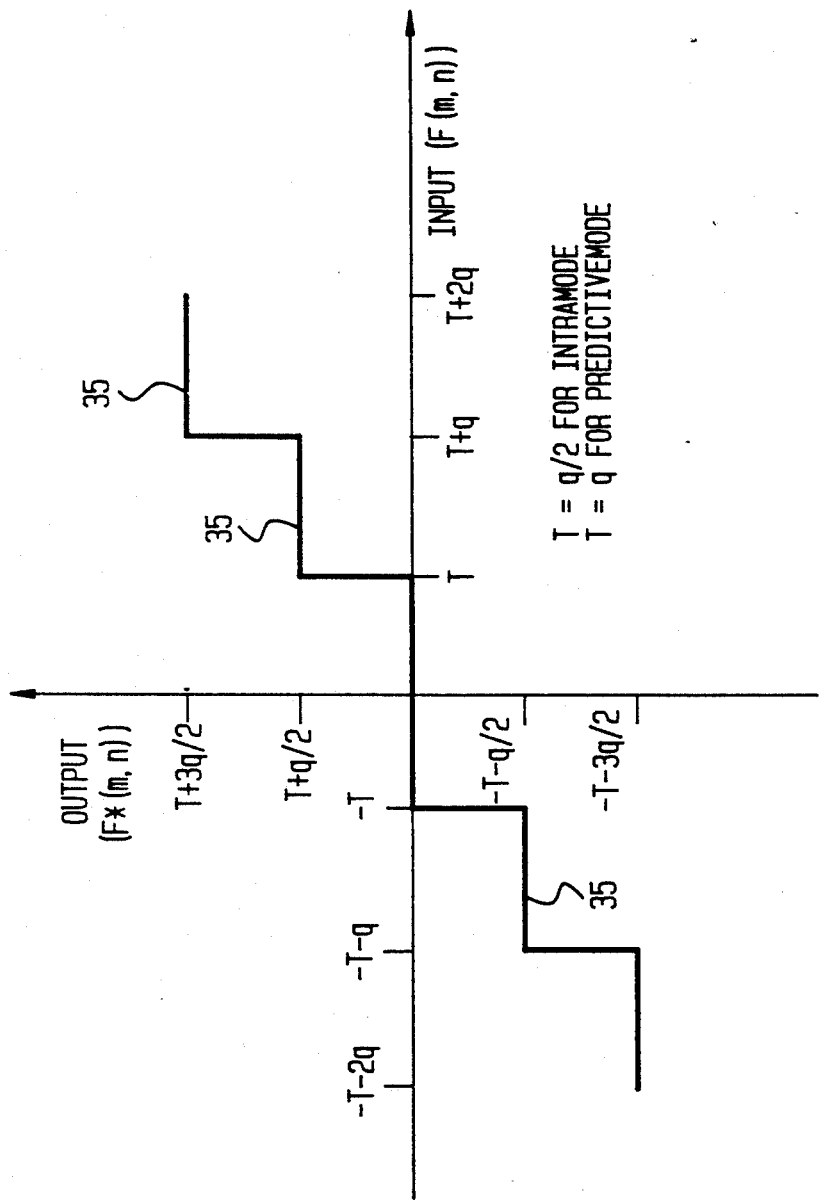
FIG. 4 schematically illustrates the operation of a quantizer.

The intra-frame coding processor 14 is illustrated in FIG. 3. A DCT processor 30 applies a discrete cosine transform to the input blocks of pixels in two dimensions. The two dimensional discrete cosine transform of an NxN block containing the individual pixel elements f(j,k) for j,k=0,1 ..., N−1 can be defined as $$F(m,n) = \frac{4C(m)C(n)}{N^2} \sum_{j=0}^{N-1} \sum_{k=0}^{N-1} f(j,k) \cdot \cos[(2j + 1)m\pi/2N] \cdot \cos[(2k + 1)n\pi/2N]$$

for $m,n = 0, 1, \ldots, N - 1$ where $C(w) = 1\sqrt{2}$ for $w = 0$ 1 for $w = 1, 2, \ldots, N - 1$ The transform coefficients are then quantized by a quantizer 32. The quantizer 32 is represented by a matrix of elements q(m,n). Each value q(m,n) determines a quantizer threshold and step size for the corresponding DCT coefficient F(m,n) FIG. 4 illustrates the operation of the quantizer 32 for a particular value of (m,n). In particular, FIG. 4 is a graph which plots quantizer input versus quantizer output for a particular value of (m,n). As shown in FIG. 4, the quantizer input F(m,n) is rounded off to a specific quantization level 35 to produce an output F*(m,n). As shown in FIG. 4, the quantization levels 35 are separated by the step size q(m,n), with a threshold T being equal to q/2 for intramode coding (for predictive mode coding the threshold T is equal to q).

Returning now to FIG. 3, the quantized transform coefficients outputted by the quantizer 32 are transmitted to the variable/fixed length coder 20 (see FIG. 2). Because decompressed data is needed for future predictive and interpolative frames, the quantized transform coefficients are inverse quantized by the inverse quantizer 34. The inverse quantized transform coefficients are then processed by the inverse DCT processor 36 and the resulting decompressed pixel values are stored in the frame memory 38. The original frame data is also needed for the next predictive and interpolative frames for purposes of motion compensation. Thus, the original frame data is stored in the frame memory 40. The memories 38 and 40 store different data, the memory 38 storing decompressed pixel values and the memory 40 storing original pixel values.

Figure 5:
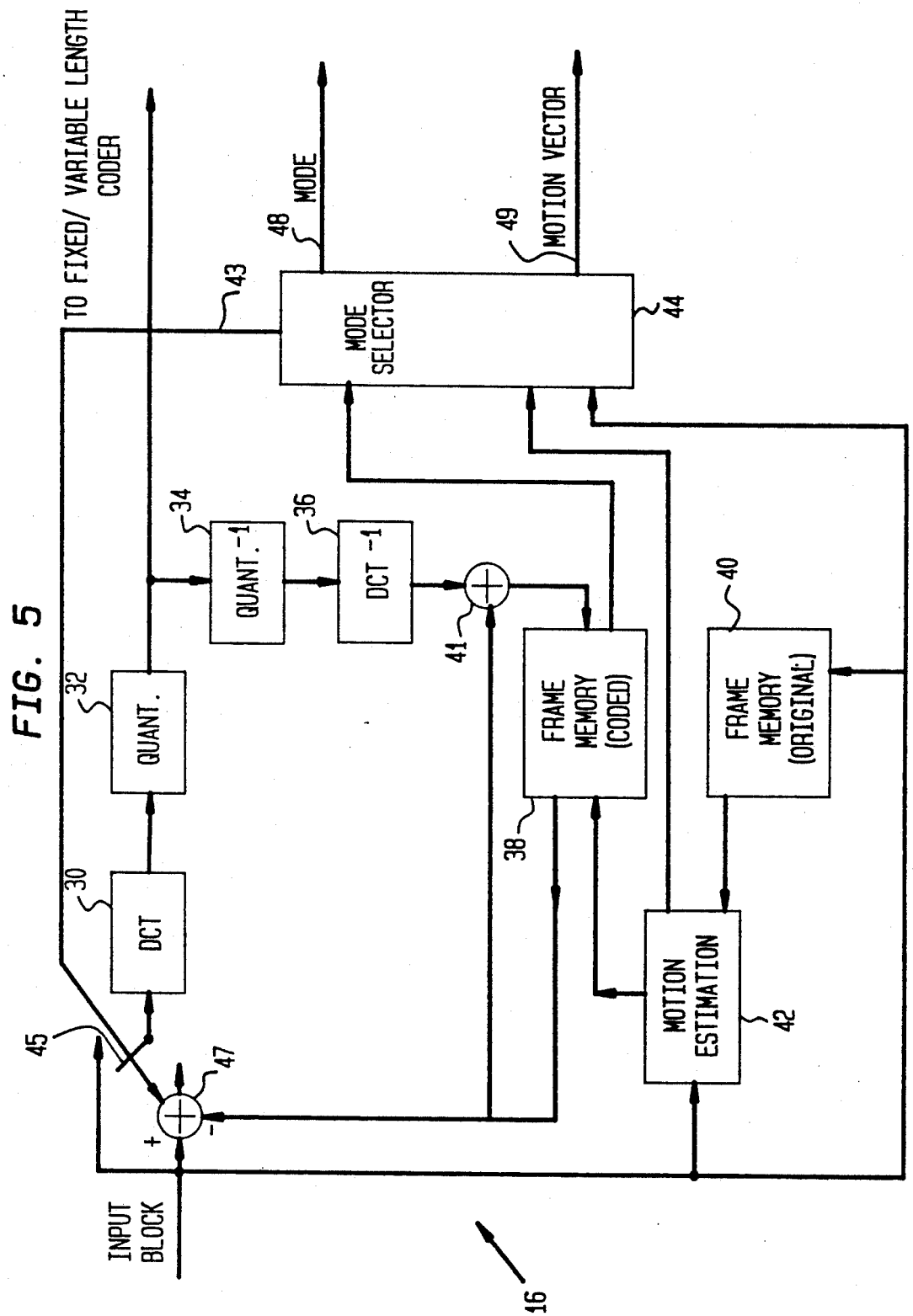
FIG. 5 schematically illustrates a coding circuit which operates on the predictive frames.

A processor 16 for performing predictive coding is illustrated in FIG. 5. The processor 16 of FIG. 5 comprises the DCT processor 30, the quantizer 32, inverse quantizer 34, the inverse DCT processor 36 and the frame memories 38 and 40.

For each input block of the predictive mode processor 16, the first step is to find the best match from the previous nearest intra-frame or predictive frame within a prechosen searching range. This is carried out by the motion estimation processor 42. Let F(m,n), m, n=0,1, ... N−1 denote a current input block and G(m−$v_x$, n−$v_y$) denote the corresponding block displaced by a motion vector $v_x,v_y$ in the previous nearest intra-frame or predictive frame. The best match vector $v_{ox},v_{oy}$ is obtained by minimizing the displaced block difference (DBD) defined as $$\sum_{m, n} |F(m,n) - G(m - v_x, n - v_y)x|$$

over a pre-chosen searching range. Note that G(m,n) is the original data stored in the frame memory 40 and not the decompressed data stored in the frame memory 38. Using the original data for motion estimation gives motion vectors independent of the quantization parameters utilized by the quantizer 32.

The motion compensated predictive error dF(m,n) is defined as $$dF(m,n) = F(m,n) - G'(m - v_{ox}, n - v_{oy})$$

where G'(m,n) represents the decompressed image stored in the memory 38 corresponding to G(m,n).

The next step for the predictive frame coding is to determine which data F(m,n) m,n=0,1, ... ,N−1 or dF(m,n) should be coded. To make this decision, a decision rule based on an activity index is utilized. The decision rule has been widely adapted in international standards (see, e.g., ISO, MPEG "MPEG Video Simulation Model 3", Document 90/041, July 1990; and CCITT SG XV, "Description of Reference Model 8 (RM8)", Document 525, June 1989). Roughly speaking, if the activity index (i.e. variance) of the original block F(m,n) is smaller than the activity index (i.e. power) of dF(m,n), intramode coding is utilized and F(m,n) is coded directly since less activity implies fewer code bits, otherwise predictive mode coding is utilized and dF(m,n) is coded.

To make the decision, information identifying the best match vector $v_{ox}, v_{oy}$ is transmitted from the motion estimation processor 42 to the frame memory 38 to access the pixel values $G'(m-v_{ox}, n-v_{oy})$. The pixel values $G'(m-v_{ox}, n-v_{oy})$ are transmitted to a mode selector 44. The mode selector 44 performs the test and outputs the decision at an output 43, which output 43 is connected to a switch 45. If the decision is to code a block using intramode coding, the switch 45 is positioned so that the pixel block is transmitted directly to the DCT processor 30 and quantizer 32. If the decision is to code using the predictive mode, the predictive error dF(m,n) is obtained by the subtraction element 47 by subtracting $G'(m-v_{ox}, n-v_{oy})$, which is read out of the frame memory 38, from the input block F(m,n). The predictive error dF(m,n) is then coded using the DCT processor 30 and quantizer 32. For both the intra-frame and predictive modes, the quantized transform coefficients output by the quantizer 32 are transmitted to the variable/fixed length coder 20 (see FIG. 2). In order for a remotely located decoder to reconstruct the video image, the remotely located decoder must know the coding mode utilized and the best match motion vector when the predictive coding mode is utilized. Information identifying the mode and best match motion vector is output by the mode selector 44 at outputs 48 and 49.

The predictively coded frame has to be reconstructed and stored in the frame memory 38 for use in the coding of future predictive and/or interpolative frames. This is accomplished on a block-by-block basis. The intramode coded blocks are reconstructed using the inverse quantizer 34 and the inverse DCT processor 36. The predictively coded blocks are reconstructed by first reconstructing the error dF(m,n) through use of the inverse quantizer 34 and inverse DCT processor 36. The reconstructed error dF'(m,n) is then added with $G'(m-v_{ox}, n-v_{oy})$ using the adder 41 to obtain the reconstructed block F'(m,n) which is stored in the frame memory 38. The original blocks F(m,n) are stored in the frame memory 40, also for use by future predictive or interpolative frames.

Figure 6:
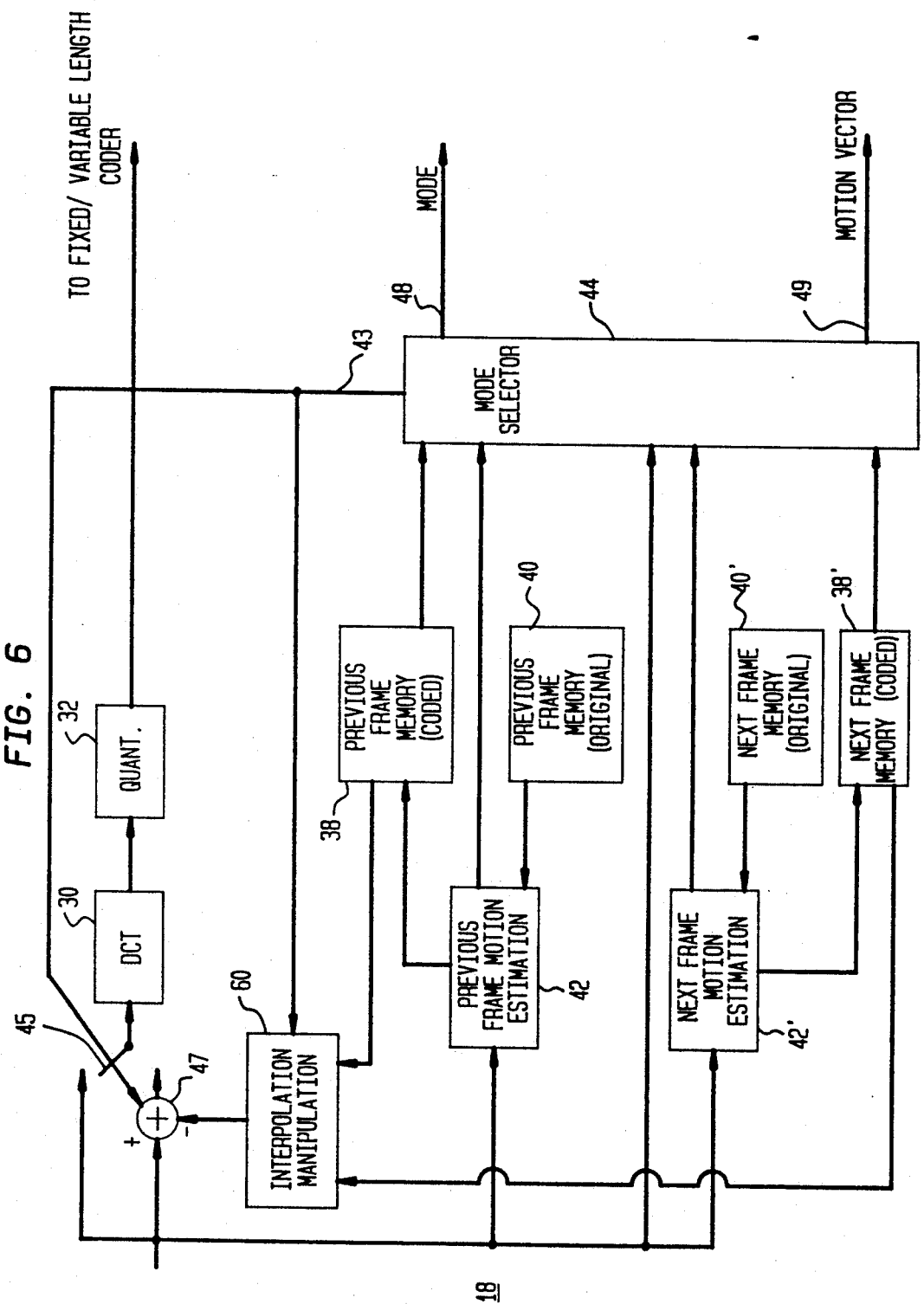
FIG. 6 schematically illustrates the operation of a coding circuit which operates on the interpolative frames.

A processor 18 for processing interpolative frames is illustrated in FIG. 6. The processing of interpolative frames is similar to that of predictive frames. The main difference between interpolative coding and predictive coding is that interpolation coding utilizes information from both the previous frame and the next frame to obtain a motion compensated prediction for a block of pixels. Thus, the interpolative processor 18 includes two additional frame memories 38' and 40' for storing the next frame after it has been reconstructed and in its original format, as well as the frame memories 38 and 40 for storing the previous frame after reconstruction and in its original format. The processor 18 also includes an additional motion estimation processor 42'.

For each input block in an interpolative frame, the two motion estimators 42 and 42' are utilized to obtain best match motion vectors from the previous and next frames, respectively, by minimizing the DBD defined above. Let $v^p_o = v^p_{ox}, v^p_{oy}$ and $v^n_{ox}, v^n_{oy}$ denote the best match vectors obtained from the previous frame $G^p(n,m)$ stored in the frame memory 40 and the next frame $G^n(n,m)$ stored in the frame memory 40'.

After obtaining the best match vectors for a block of pixels, the next step is to determine which motion compensation is to be utilized.

The motion compensation decision is made as follows:

i. Let $DBD_{min} = \text{Min}\{DBD(v^p_o; g^p), DBD(v^n_o; g^n), DBD^{pn}\}$, $$DBD^{pn} = \frac{1}{N^2} \sum_{n=0}^{N-1} \sum_{m=0}^{N-1} |F(m,n) - (1/2)[G^p(m - v^p_{ox}, n - v^p_{oy}) + G^n(m - v^n_{ox}, n - v^n_{oy})]|$$

ii. if $DBD_{min}$ is equal to $DBD(v^p_o; g^p)$, only $v^p_o$ is used for computing the motion-compensated predictive error;

iii. Else if $DBD_{min}$ is equal to $DBD(v^n_o; g^n)$, only $v^n_o$ is used for computing the motion-compensated predictive error;

iv. Else, both motion vectors $v^p_o$ and $v^n_o$ are used to compute the motion-compensated predictive error.

Once it is decided which motion compensation to use, it is then necessary to decide whether the block is to be coded using an intramode or a predictive mode. The decision rule is the same one as described above for the predictive processor. The interpolation manipulation unit 60 of FIG. 6 insures that appropriate pixel data from the memory 38 and/or 38' is transmitted to the subtraction element 47 when a predictive mode is utilized.

As discussed above, in all three compression modes—intra-frame, predictive, and interpolative—the quantized transform coefficients are coded by the coder 20 with either a fixed length code (FLC) or a variable length code (VLC). Table 1 shows the symbols that have to be transmitted for each compression mode and indicates whether FLC or VLC is used.

TABLE 1

| Symbol Type | Intra-frame | Predictive | Interpolative |
| --- | --- | --- | --- |
| DC Transform coefficient | VLC | FLC | FLC |
| AC Transform coefficient | VLC | VLC | VLC |
| Motion Vectors |  | VLC | VLC |
| Mode Index |  | FLC | VLC |

Generally speaking, if the total number of symbols of a particular type is relatively small, FLC is used because it results in a simpler coding structure, otherwise VLC is utilized. A frame adaptive approach is adopted in designing all VLCs. The VLCs are selected for each frame according to the corresponding symbol statistics with the shortest VLC code words being chosen for the most frequently occurring symbols. Although this introduces code book overhead associated with communicating the meaning of VLC code words to the decoder, this overhead is small in practice and the overall bit rate is lower than when global VLC's are used for all frames.

C. Rate Buffer Control Strategy

In accordance with the present invention, the quantizer 32 (see FIGS. 3, 5, and 6) can choose among S quantization matrices $Q_0, Q_1, \ldots, Q_{S-1}$. The elements in the $i^{th}$ quantization matrix Q are labeled $q_i(m,n)$, where $q_i(m,n)$ is the quantizer step size for the transform coefficient located at (m,n) in transform space. In general the elements $q_i$ are smaller for smaller i. Thus, the highest bit rate is achieved when $Q_0$ is utilized and the lowest bit rate is achieved when $Q_{S-1}$ is utilized.

In an illustrative embodiment of the invention the elements $q_i(m,n)$ of the quantization matrices $Q_i$ are defined as $$q_i(m,n) = q_0(m,n) + i[q_{S-1}(m,n) - q_0(m,n)]/S - 1$$

Note that in this scheme only two, instead of S, quantization matrices, namely $Q_0$ and $Q_{S-1}$, need to be sent to a remotely located decoder. Although in some embodiments of the invention different matrices $Q_0$ and $Q_{S-1}$ may be used for the different compression modes, in the illustrative embodiment of the invention described herein, the same $Q_0$ and $Q_{S-1}$ are used for all compression modes.

Let $R_{SGOP}$ and $R_{GOP}$ denote the desired bit rate for transmission from the rate buffer 22 into the telecommunications channel 24 (see FIG. 2) per SGOP and per GOP respectively. The rates $R_{SGOP}$ and $R_{GOP}$ are obtained by multiplying the desired bit rate per frame by the number of frames in each SGOP and GOP respectively.

Let $B_\alpha$ represent the content of the buffer 22 before $SGOP_\alpha$ is coded, where $\alpha$, $\alpha = 0, 1, \ldots, L-1$, in an index which identifies an SGOP in the current GOP, each GOP comprising a first frame and L SGOPs. It is desired to maintain $B_\alpha$ in a predetermined range defined by a lower limit, which is $-p_1 B$ and an upper limit, which is $p_2 B$, where B is the buffer size and $p_1 + p_2 = 1$. The initial buffer content is zero as measured relative to the lower limit $-p_1 B$.

The rate buffer control strategy is described below. The processing required to carry out the rate buffer control strategy occurs at the adjustment processor 26 of FIG. 2.

(1) First Frame in GOP

The first frame in the current GOP is intra-frame coded using a quantizer matrix determined from the last SGOP in the previous GOP. The buffer content is updated by adding the actual number of coded bits generated by the coding circuit and then subtracting the number of bits transmitted from the rate buffer into the communication channel. If the buffer content reaches an upper limit close to $p_2 B$, the buffer is in an overflow alert state. The processing for an overflow alert state is described at (5) below.

(2) Estimated Bit Count for an SGOP

Before $SGOP_\alpha$ is coded, there is determined a quantity:

$$EB_\alpha = \frac{R_{SGOP}(L - \alpha) + H_{SM} * (R_{GOP} - INTRABITS) - B_\alpha}{(L - \alpha) + H_{SM} * L}$$

where

INTRABITS is the actual coded bit count from the most recent intra-frame;

L is the number of SGOPs in each GOP; and $H_{SM}$ is a non-negative integer.

Roughly speaking, $EB_\alpha$ is an estimated bit count for the current SGOP so that the buffer can be emptied to zero bits at the end of the next $H_{SM}$ GOPs following the current GOP. (This means that if the estimated bit count $EB_\alpha$ were to be utilized for each SGOP until the end of $H_{SM}$ GOPs following the current GOP and the desired number of bits is transmitted out of the buffer in each frame interval, the buffer would become empty). The integer $H_{SM}$ controls the instant when the buffer is expected to be emptied to zero bits. When $H_{SM} = 0$, $EB_\alpha$ for small $\alpha$ and large $\alpha$ may be drastically different. This may cause improper and unnecessary quantizer adjustments. A large $H_{SM}$ results in a better quantizer adjustment, but at a price of a larger period of buffer emptying which may imply a larger buffer size. Setting $H_{SM} = 1$ is a good tradeoff between these two factors.

(3) Coding $SGOP_\alpha$

Use the quantizer determined according to (4) below to code the frames in $SGOP_\alpha$ using predictive and interpolative coding. The index of the quantizer matrix used to code $SGOP_\alpha$ is $i_\alpha$ where $0 \leq i_\alpha < S - 1$. The buffer content $B_\alpha$ is updated by adding the number of actual code bits generated by coding $SGOP_\alpha$ and then subtracting the bits transmitted into the communication channel. If the buffer content reaches an upper limit close to $p_2 B$, the buffer is in an overflow state and the processing is in accordance with (5) below.

(4) Determine the quantizer $i_\alpha$ for $SGOP_\alpha$

A quantization matrix with index $i_\alpha$ is used to code $SGOP_\alpha$. The quantization matrix $i_\alpha$ is chosen as follows.

$$i_\alpha = \begin{cases} max(0, i_{\alpha-1} - j) & \text{if } t_{-j-1} \leq ID_{\alpha-1} \leq t_{-j} \\ i_{\alpha-1} & \text{if } t_{-1} \leq ID_{\alpha-1} \leq t_1 \\ min(S - 1, i_{\alpha-1} + j) & \text{if } t_j < ID_{\alpha-1} \leq t_{j+1} \end{cases}$$

where $j = 1, 2, \ldots, J$; and where $ID_{\alpha-1}$ is a deviation of the actual number of code bits, $SGOPBITS_{\alpha-1}$, for $SGOP_{\alpha-1}$ from the estimated numbered bits $EB_{\alpha-1}$, for $SGOP_{\alpha-1}$, so that:

$$ID_{\alpha-1} = \frac{SGOPBITS_{\alpha-1} - EB_{\alpha-1}}{R_{SGOP}}$$

The quantities $t_{-j-1}, t_{-j}, \ldots, t_{j-1}$ are predetermined thresholds with $t_{-J-1} = -\infty$ and $t_{J+1} = \infty$. Note that the quantizer matrix index can only be incremented or decremented by a maximum of J for each adjustment. Constraining the range of the quantizer index change guarantees a smooth video quality transition. Changing the quantizer index once per SGOP insures that there are no video quality transitions within particular frames.

In a preferred embodiment of the invention, the quantization matrix for the first intra-frame and first SGOP of a GOP is chosen based on the EB and SGOPBITS of the last SGOP of the previous GOP.

(5) Overflow and Underflow Processing

If the rate buffer 22 content reaches a predetermined upper limit, the frames following the current frame are not coded until the buffer is emptied to a predetermined lower limit near zero bits. Only trivial header information associated with these frames is sent to the decoder. At the decoder, these frames are accounted for by a repetition of a previous coded frame. After the buffer content is reduced to the desired level, the next frame starts a brand new GOP cycle. The quantization matrix index is set to $S - 1$.

When the rate buffer underflows—i.e. falls below $-p_1 B$ bits—dummy bits are filled in so that the buffer maintains a minimum of $-p_1 B$ bits.

When $Q_0$ and $Q_{S-1}$ are properly chosen buffer overflow and underflow should occur rarely.

D. Typical Parameter Values

Illustratively, the video coding scheme of the present invention is utilized to code CCIR 601 digital video. The CCIR 601 digital video comprises thirty frames per second. The frame size is 720 pixels/line×480 lines/frame for the luminance component (Y) and 360 pixels/line×480 lines/frame for the chrominance components (U and V). Because the human perception of chrominance is not highly sensitive, the chrominance components may be preprocessed, using averaging and sub-sampling, into a lower resolution of 360 elements line×240 lines/frame. The algorithm of the present invention codes studio quality video with a pseudo-constant bit rate of 5 Mbit/sec or higher.

Some illustrative parameters which may be utilized to implement the invention are as follows. The block size utilized for coding is 8×8. The DCT coefficients, before quantization, are normalized to a maximum possible range of $[-5410, 510]$ given an input range of $[-255, 255]$. Some illustrative quantization matrices are $$Q_o = \begin{matrix} 2 & 2 & 2 & 2 & 2 & 2 & 2 \\ 2 & 2 & 2 & 2 & 2 & 2 & 2 \\ 2 & 2 & 2 & 2 & 2 & 2 & 2 \\ 2 & 2 & 2 & 2 & 2 & 2 & 2 \\ 2 & 2 & 2 & 2 & 2 & 2 & 2 \\ 2 & 2 & 2 & 2 & 2 & 2 & 2 \\ 2 & 2 & 2 & 2 & 2 & 2 & 2 \\ 2 & 2 & 2 & 2 & 2 & 2 & 2 \end{matrix}$$

$$Q_{S-1} = \begin{matrix} 4 & 4 & 5 & 5 & 6 & 6 & 7 & 7 \\ 4 & 5 & 5 & 6 & 6 & 7 & 7 & 8 \\ 5 & 5 & 6 & 6 & 7 & 7 & 8 & 8 \\ 5 & 6 & 6 & 7 & 7 & 8 & 8 & 10 \\ 6 & 6 & 7 & 7 & 8 & 8 & 10 & 10 \\ 6 & 7 & 7 & 8 & 8 & 10 & 10 & 13 \\ 7 & 7 & 8 & 8 & 10 & 10 & 13 & 13 \\ 7 & 8 & 8 & 10 & 10 & 13 & 13 & 13 \end{matrix}$$

The rate buffer size is set to 400 ms of the channel rate, $p_1 = 0.25$ and $p_2 = 0.75$. When the buffer content reaches 0.65 B, an overflow alert is triggered.

Illustratively,
a) $N=15$, $M=2$, and $L=7$
b) $S=31$
c) $H_{SM}=1$
d) $J=3$
e) $t_1 = -t_{-1} = 0.05$, $t_2 = -t_{-2} = 0.1$, $t_3 = -t_{-3} = 0.2$
f) The motion searching range for predictive frames: $[-22, 22]$
g) The motion searching range for interpolative frames: $[-11, 11]$

E. Conclusion

In short, a method for coding frames of video is disclosed. A coding circuit includes a processor for performing an orthogonal transform such as a discrete cosine transform and a quantizer for quantizing the resulting transform coefficients. The coding circuit codes the video frames using an intra-frame, predictive or interpolative coding mode to generate code bits at a variable bit rate. The code bits are stored at a variable rate in a rate buffer, which rate buffer transmits the code bits into a communication channel at a pseudo-constant rate, i.e., a rate which is constant in every time interval of one frame.

To maintain the contents of the rate buffer within predetermined limits, the quantization parameters utilized by the quantizer are periodically adjusted to increase or decrease the amount of code bits generated by the coding circuit. In accordance with the present invention, the quantization parameters are changed on a global SGOP level to avoid changes of quantization parameters, and corresponding changes in decoded image quality, within particular frames. Constraints are placed on the quantization parameter changes to avoid drastic changes in decoded video image quality. The change in quantization parameters for coding the next SGOP is determined by a measure of the deviation between the actual number of coded bits generated by the coding circuit for the previous SGOP and an estimate of the number of code bits for the previous SGOP. The estimated number of code bits is determined based on the contents of the rate buffer such that the rate buffer would be emptied in a predetermined time period.

Finally, the above-described embodiments of the invention are intended to be illustrative only. Numerous alternative embodiments may be devised by those skilled in the art without departing from the spirit and scope of the following claims.

We claim:

1. A method for coding video frames comprising the steps of
coding said video frames using a coding circuit including a processor for performing an orthogonal transform to produce transform coefficients and a quantizer for quantizing the transform coefficients to generate code bits at a variable bit rate,
storing the code bits in a rate buffer at a variable bit rate and transmitting the code bits out of the rate buffer and into a communication channel at a substantially constant bit rate and,
maintaining the contents of said rate buffer in a predetermined range by adjusting quantization parameters utilized by said quantizer to increase or decrease the amount of code bits generated by said coding circuit for a next set of one or more frames, the adjustment of quantization parameters being in response to a deviation between the actual number of code bits generated by the coding circuit for a previous set of one or more frames and an estimate of the number of code bits for said previous set of one or more frames.

2. The method of claim 1 wherein said estimate is determined in accordance with the contents of the rate buffer such that the rate buffer will be emptied in a predetermined time period.

3. The method of claim 1 wherein said coding circuit codes said video frames using intra-frame, predictive and interpolative coding.

4. The method of claim 1 wherein said step of maintaining the contents of said rate buffer in a predetermined range by adjusting quantization parameters comprises adjusting the quantization parameters within a predetermined range.

5. The method of claim 1 wherein said video frames are organized into groups of frames (GOPs) with each group of frames being in turn organized into a first frame which is intra-frame coded by said coding circuit and a plurality of sub-groups of frames (SGOPs) whose frames are predictively or interpolatively coded by said coding circuit, said step of maintaining the contents of said rate buffer in a predetermined range by adjusting said quantization parameter taking place once for each sub-group of frames.

6. The method of claim 5 wherein said estimate is determined such that said rate buffer will be emptied within a predetermined number of GOPs.

7. A method for coding video frames organized into sets of one or more video frames comprising the steps of:
generating code bits at a variable bit rate by a coding circuit to code said video frames,
storing said code bits in a rate buffer, and
transmitting said code bits from said rate buffer via a communication channel at a substantially constant bit rate,
the step of generating code bits comprising the step of selecting a next quantizer in response to a deviation of an actual number of code bits generated by said coding circuit for a previous set of frames from an estimated number of code bits for said previous set of frames to maintain the contents of said rate buffer in a predetermined range.

8. The method of claim 7 wherein quantization parameters of the selected next quantizer do not deviate by more than a predetermined amount from quantization parameters of a quantizer previously selected for the previous set of frames.

9. The method of claim 7 wherein the estimated number of code bits for the previous set of frames is determined so that the rate buffer will be emptied after a predetermined number of sets of frames are coded.

10. The method of claim 7 wherein said method includes the step of halting the coding of said frames until the contents of said rate buffer fall below a second specific limit, if the contents of said rate buffer exceed a first specific limit.

11. The method of claim 7 wherein particular ones of said video frames are intra-frame coded, predictively coded, and interpolatively coded by said coding circuit.

12. The method of claim 7 wherein said step of generating code bits at a variable bit rate by a coding circuit comprises the step of generating orthogonal transform coefficients from pixel values contained in said video frames, quantizing the coefficients using the selected quantizer and converting the quantized transform coefficients into fixed or variable length code words.

13. The method of claim 7 wherein said video frames are organized into groups of frames (GOPs), wherein each group of frames is further organized into a first frame and a plurality of sub-groups of frames (SGOPs), wherein the first frame of each group of frames is intra-frame coded using said coding circuit, wherein the frames of each sub-group of frames are interpolatively or predictively coded by said coding circuit, and wherein said step of selecting a next quantizer is carried out once for each sub-group of frames.

14. A method for coding a series of video frames organized into groups of frames (GOPs), which in turn are organized into sub-groups of frames (SGOPs), through use of a coding circuit comprising a processor for carrying out an orthogonal transform and a quantizer for quantizing the coefficients generated by said orthogonal transform, and a rate buffer for receiving code bits from said coding circuit at a variable rate and outputting the code bits into a communication channel at a substantially constant rate, said method comprising the steps of:

after coding a previous SGOP by said coding circuit utilizing a previous quantizer, selecting a next quantizer from a plurality of available quantizers for the next SGOP by determining a deviation measure of the actual number of code bits generated by said coding circuit for the previous SGOP from an estimated number of code bits for the previous SGOP, and utilizing the deviation measure to select said next quantizer, determining an estimated number of code bits for the next SGOP based on the contents of the frame buffer after coding the previous SGOP, coding said next SGOP using said processor and said next quantizer and storing the coded bits of the next SGOP in said rate buffer, said next quantizer being chosen such that the next quantizer has quantization parameters which are constrained to be within a predetermined range of quantization parameters of the previous quantizer.

15. The method of claim 14 wherein said orthogonal transform is a discrete cosine transform.

16. The method of claim 14 wherein each GOP comprises N frames including a first frame and L SGOPs each of which comprises M frames, whereby $N = ML + 1$, and wherein the first frame and first SGOP of a GOP are coded using a quantizer selected through use of a deviation measure of the actual number of code bits generated by said coding circuit for the last SGOP of the previous GOP from an estimated number of code bits for the last SGOP of the previous GOP.

17. The method of claim 14 wherein the first frame of each GOP is intra-frame coded by said coding circuit and the frames of each SGOP in a GOP are predictively or interpolatively coded by said coding circuit.

18. The method of claim 14 wherein said plurality of available quantizers comprises
S sets of quantization matrices $Q_i$, ($i = 0, 1, \ldots, S-1$) and wherein each quantization matrix $Q_i$ is comprised of elements $q_i = (m,n)$ such that $$q_i(m,n) = q_0(m,n) + i[q_{S-1}(m,n) - q_0(m,n)]/S - 1.$$

19. The method of claim 18 wherein the step of selecting a next quantizer comprises the step of selecting a next quantization matrix such that $i_{next} - i_{previous} \leq J$ where $i_{next}$ is the index of the next quantization matrix, $i_{previous}$ is the index of a previous quantization matrix and $J$ is a predetermined integer.

20. The method of claim 19 wherein the step of selecting a next quantization matrix comprises selecting the index $i_{next}$ of the next quantization matrix such that $$\begin{aligned} maxi_{next} &= (0, i_{previous} - j) \text{ if } t_{-j-1} \leq ID_{previous} < t_{-j} \\ i_{next} &= i_{previous} \quad \text{if } t_{-1} \leq ID_{previous} < t_1 \\ mini_{next} &= (S - 1, i_{previous} + j) \text{ if } t_j \leq ID_{previous} < t_{j+1} \end{aligned}$$

where $j = 1, 2, \ldots, J$ and where the values $t_{-31 j-1}, t_{-j}, \ldots, t_j, t_{j+1}$ are predetermined thresholds and where $ID_{previous}$ is said deviation measure.

21. The method of claim 20 wherein the deviation measure for selecting said next quantization matrix is determined by $$ID_{previous} = \frac{SGOPBITS_{previous} - EB_{previous}}{R_{SGOP}}$$

where $SGOPBITS_{previous}$ is the number of code bits actually generated by said coding circuit for said previous SGOP, $EB_{previous}$ is the estimated number of code bits for said previous SGOP, and $R_{SGOP}$ is a desired number of bits per SGOP transmitted from said rate buffer to said communication channel.

22. The method of claim 14 wherein the estimated number of code bits for the next SGOP is determined such that the rate buffer will be emptied after a predetermined number of GOPs.

23. The method of claim 14 wherein said method further includes the step of halting the coding of said video frames by said coding circuit until the contents of said rate buffer fall below a second predetermined level, if the contents of said rate buffer exceed a first predetermined level.

* * * * *